United States Patent [19]
Tanaka

[11] Patent Number: 5,476,242
[45] Date of Patent: Dec. 19, 1995

[54] STRUCTURE FOR MOUNTING MOTOR PUMP ON AUTOMOTIVE WINDOW WASHER TANK

[75] Inventor: Hiroaki Tanaka, Kiryu, Japan

[73] Assignee: Mitsuba Electric Manufacturing Co., Ltd., Kiryu, Japan

[21] Appl. No.: 165,999

[22] Filed: Dec. 14, 1993

[30] Foreign Application Priority Data

Dec. 28, 1992 [JP] Japan .................. 4-093498 U

[51] Int. Cl.⁶ .................................................. F16M 1/00
[52] U.S. Cl. ........................................... 248/674; 280/634
[58] Field of Search ................................ 220/562, 914, 220/905; 248/674; 280/830, 834

[56] References Cited

U.S. PATENT DOCUMENTS

| | | | |
|---|---|---|---|
| 3,987,294 | 10/1976 | Carlson | 280/834 X |
| 4,098,218 | 7/1978 | Pichl | 280/834 X |
| 4,703,771 | 11/1987 | Mimura | 280/834 X |
| 4,741,362 | 5/1988 | Smola | 280/834 X |
| 5,020,687 | 6/1991 | Seizert | 220/905 |
| 5,344,038 | 9/1994 | Freeman | 220/562 X |

FOREIGN PATENT DOCUMENTS

| | | | |
|---|---|---|---|
| 2740229 | 3/1979 | Germany | 280/834 |
| 3721691 | 6/1988 | Germany | 280/834 |
| 3938959 | 5/1991 | Germany | 280/834 |
| 83224 | 4/1987 | Japan | 280/834 |
| 116313 | 5/1987 | Japan | 280/834 |
| 63-129661 | 8/1988 | Japan . | |
| 124445 | 5/1993 | Japan | 280/834 |

Primary Examiner—J. Franklin Foss
Attorney, Agent, or Firm—Oliff & Berridge

[57] ABSTRACT

There is provided a washer tank which can reliably have installed thereon a plurality of motor pumps and yet can be blow-formed without undercuts. The tank mounting portion of the tank body is formed so as to extend from the upper side to the lower side of the tank body. The tank mounting portion has a concave groove portion having a groove width for receiving the motor pumps in parallel and a connecting bridge portion which connects both edges of the opening of the concave groove portion. The bridge portion has a convex portion for preventing each motor pump from shifting position and contacting the adjacent motor pump. The convex portion is formed on the inner peripheral surface of the connecting bridge portion. The pump mounting portion, as defined by the groove and bridge portions, is an enclosed substantially ring shape that surrounds the periphery of the motor pumps installed in parallel in the washer tank. The parting plane of the split pattern is positioned so as to pass transversely through the concave groove portion and substantially parallel to the connecting bridge portion.

8 Claims, 3 Drawing Sheets

STRUCTURE FOR MOUNTING MOTOR PUMP ON AUTOMOTIVE WINDOW WASHER TANK

BACKGROUND OF THE INVENTION

1. Field of the Invention

The invention relates to a structure for mounting motor pumps in an automotive window washer tank used in buses, trucks and passenger cars.

2. Description of the Related Art

Generally, a motor vehicle of this kind is equipped with a window washer tank containing washing liquid for cleaning the window surface. Some window washer tanks have a plurality of motor pumps installed integrally.

One such type window washer tank has a concave groove shaped pump mounting portion formed on the outside wall surface of tank. The motor pumps are fitted to this pump mounting portion as disclosed in Japanese Utility Model Laid Open No. 129661/1988. For this window washer tank, it is necessary to prevent the motor pumps from falling off. For this reason, the groove depth of the pump mounting portion is made greater than the radius of motor pump and the motor pumps are retained in place by separately installing a falling-off preventive member, such as a band, on the tank body or installing an engagement claw which engages with the outer peripheral surface of the motor pump.

However, with the former method, the number of parts increases because the special-purpose falling-off preventive member is needed. In addition, production time and cost are increased because of the need to install the falling-off preventive member to the tank body.

With the latter method, although not a problem with the former method, consideration must be given to the positioning of adjacent motor pumps. In addition, when the tank body is blow-formed by using a split pattern, the engagement claws protruding from both sides of opening edge cause remarkable undercuts, so that the pattern drawing operation is difficult to perform. On the contrary, if pattern drawing is considered, the protrusion of the engagement claws cannot be made very great. As a result, falling-off of the motor pumps cannot be reliably prevented.

SUMMARY OF THE INVENTION

Accordingly, an object of the invention is to provide a structure for mounting motor pumps in an automotive window washer tank which does not have the above-described drawbacks. To achieve the above object, a structure for mounting the motor pumps is provided to the window washer tank that is blow-formed using a split pattern. In forming the pump mounting portion for mounting a plurality of motor pumps to the tank body of the window washer tank, the pump mounting portion is formed in an elongated groove shape extending from one side of the tank body to the other side. The pump mounting portion is of a ring-like or enclosed shape, comprising a concave groove portion having a groove width for accommodating the motor pumps in parallel and a connecting bridge portion which connects both ends of the opening of the concave groove portion in a bridge form. The pump mounting portion also has a convex portion for preventing a motor pump from shifting to the adjacent motor pump side which is formed on the inner peripheral surface of the connecting bridge portion, so that the outer periphery of the motor pumps installed in parallel is surrounded in an embraced manner. The parting plane of the split pattern is positioned so as to pass through the concave groove portion and the connecting bridge portion.

The invention reliably prevents the falling-off of motor pumps and allows the positioning of the pump motors by the pump mounting portion, formed on the tank body, without requiring a special-purpose falling-off preventive member. Moreover, the tank body can be blow-formed without undercuts.

These and other objects, features and advantages of the invention will become more apparent from the following description of the preferred embodiments taken in conjunction with the accompanying drawings.

DESCRIPTION OF THE PREFERRED EMBODIMENTS

Figure 1:
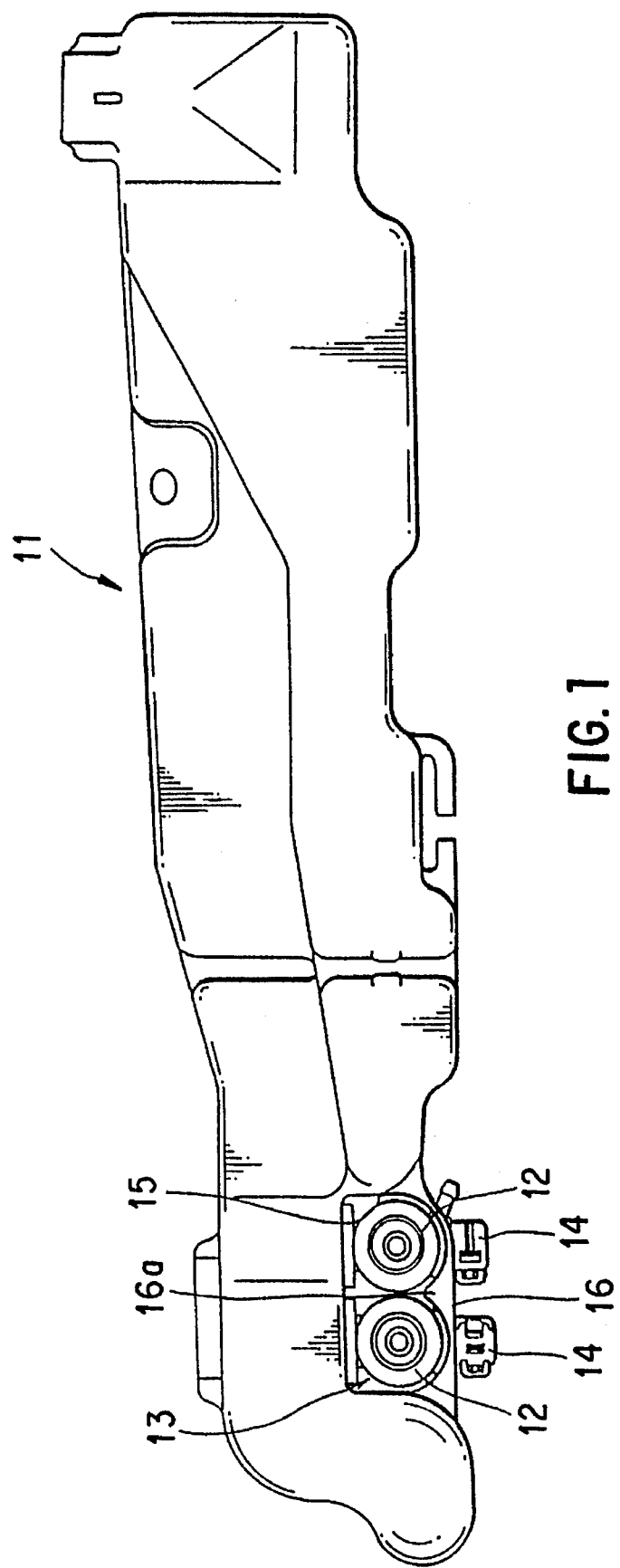
FIG. 1 is a plan view of a window washer tank.
Figure 2:
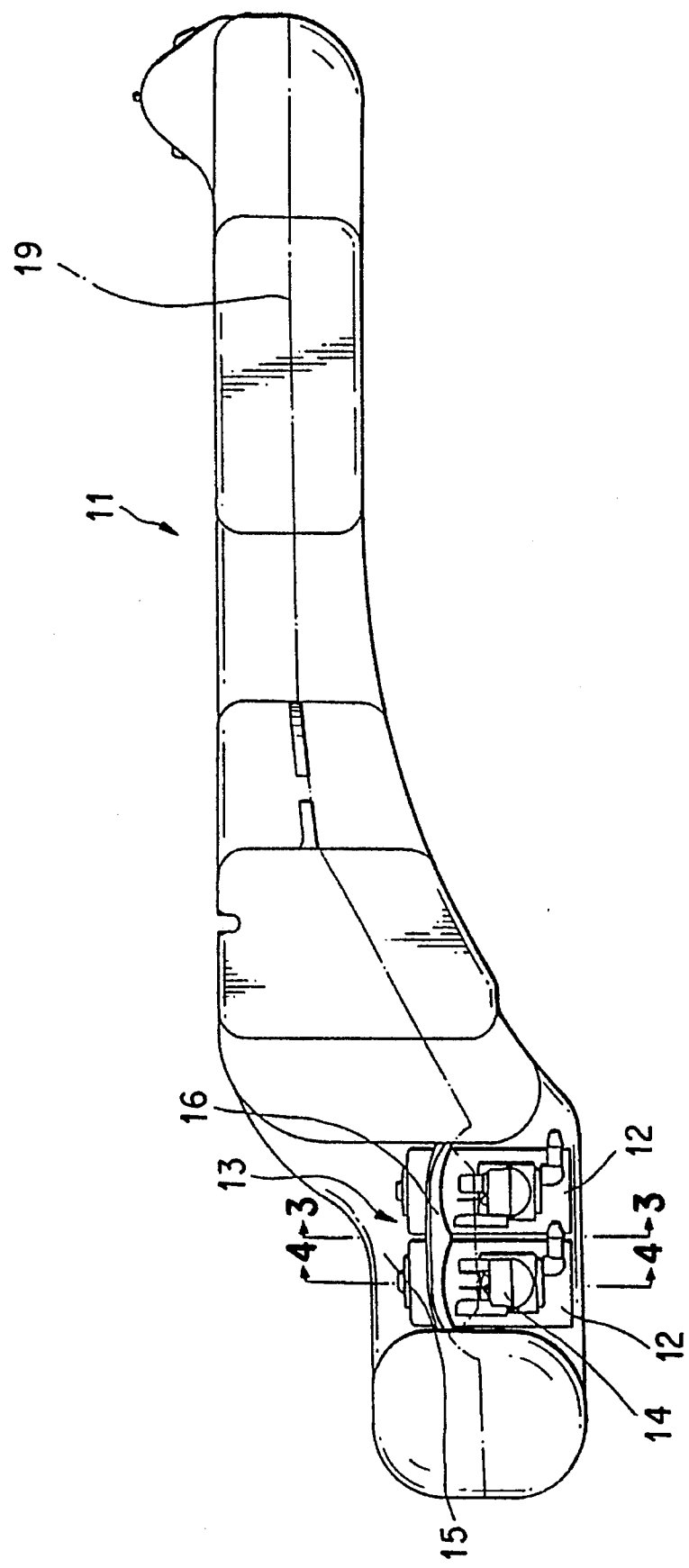
FIG. 2 is a side view of a window washer tank.
Figure 5:
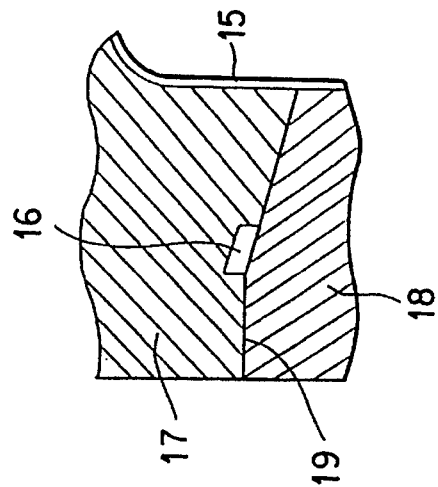
FIG. 5 is a partially sectional view of a split pattern.

One embodiment of the invention will be described with reference to the drawings. In FIGS. 1 and 2, reference numeral 11 denotes the tank body of a blow-formed resin window washer tank. A pump mounting portion 13 is formed on the outer side of the tank body 11 to hold two motor pumps 12, one for a front window and one for a rear window.

The motor pump 12 is substantially cylindrical. On one side of the peripheral surface of the motor pump 12 is a coupler 14 having a terminal for connecting to a terminal of a battery (not shown). The pump mounting portion 13 formed on the outer side of the tank body 11 has a groove the width of which can accommodate two motor pumps 12 installed in parallel. The pump mounting portion 13 comprises a concave groove portion 15 formed in an elongated groove shape extending from one side of the tank body to the other side (that is, from the upper or top side to the lower or bottom side of the tank body) and a connecting bridge portion 16 connected in a bridge form between both edges of the opening of the concave groove portion 15, so that an opening having a ring-like or enclosed shape is formed as viewed in plan.

Two motor pumps 12 are assembled in parallel by inserting them into the pump mounting portion 13 from the end without the coupler 14. On the inner peripheral surface of the connecting bridge portion 16, a convex portion 16a is formed at the position between the two motor pumps 12 installed in parallel. The connecting bridge portion 16 prevents either motor pump 12 from shifting to the adjacent motor pump 12 side. The motor pumps 12, thus assembled, are supported by the inner peripheral surface of the concave groove portion 15 on one side and by the inner peripheral surface of the connecting bridge portion 16 on the other side, so that the motor pumps 12 are fitted in an embraced manner.

The tank body 11 having the pump mounting portion 13 formed into the ring-like or enclosed shape is blow-formed by using a pair of split patterns 17 and 18. The parting plane (represented as a parting line in dot-dash on the tank body in FIG. 2) 19 is positioned so as to pass along the lower surface of the connecting bridge portion and through the inner peripheral surface of the concave groove portion 15, by which pattern drawing can be performed without undercuts by using the pair of split patterns 17 and 18 to define the pump mounting portion 13 having the ring-like or enclosed shape.

Figure 4:
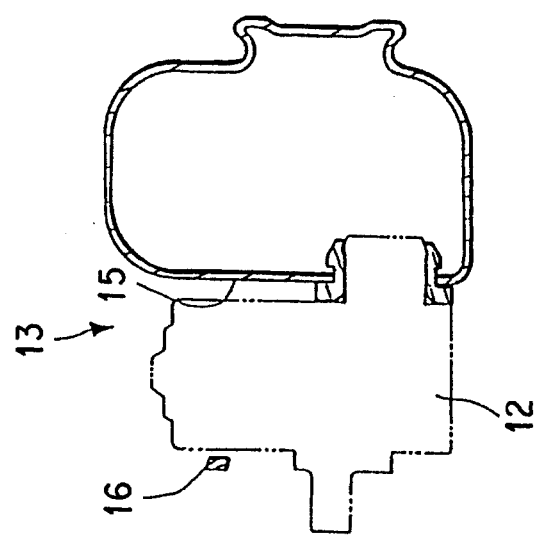
FIG. 4 a sectional view taken along the line 4—4 of FIG. 2.
Figure 3:
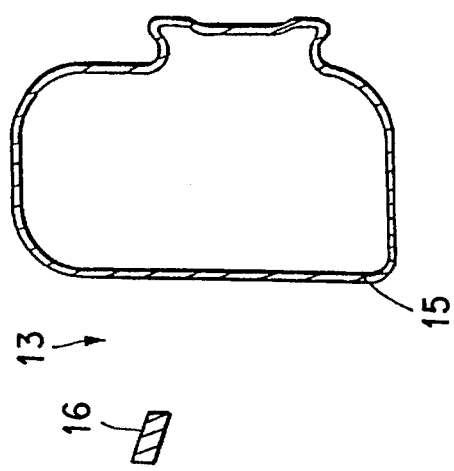
FIG. 3 is a sectional view taken along the line 3—3 of FIG. 2.

As shown in FIGS. 3 and 4, the connecting bridge portion 16 substantially has a cross section of a parallelogram in which the outer peripheral surface shifts upward with respect to the inner peripheral surface. The connecting bridge portion 16 supports the motor pumps 12 at a higher position than the vertical center position of the motor pump 12 to avoid the coupler 14 of the motor pump 12. Therefore, the connecting bridge portion 16 is formed in a circular arc shape so that the portion supporting both the right and left sides of the motor pump 12 is lower than the portion supporting the center of the motor pump 12 in the front view. Thus, the connecting bridge portion 16 supports the motor pumps 12 at the closest possible position to the vertical center of the motor pump 12 while avoiding the coupler 14.

The parting plane 19 at the concave groove portion is shifted with respect to the parting plane 19 formed at the connecting bridge portion 16 so as to coincide with the parting plane 19 of the tank body 11 if possible. Therefore, the connecting bridge portion 16 is formed at a position which shifts from the center of the motor pump 12 in the vertical direction (corresponding to the direction from the one or top side of tank body to the other or bottom side in this invention). As a result, in this embodiment in which the connecting bridge portion 16 and its parting plane 19 are formed at a position which shifts from the center of the motor pump 12, unlike the case where the parting plane 19 of the concave groove portion 15 is shifted from the position of parting plane 19 of the tank body 11 in the same manner as the parting plane of the connecting bridge portion 16, consideration is given to the tank body 11 so that the parting plane 19 of the tank body 11 is not complex, and in turn the shape of split pattern is not complex. Additionally, there is no disadvantage in terms of strength.

In this embodiment of the invention, two motor pumps 12 are installed in parallel so that their outer peripheral surfaces are embraced throughout each periphery by the pump mounting portion 13 formed on the tank body 11 in a ring-like or enclosed shape as shown in the plan view of FIG. 1. Moreover, the two adjacent motor pumps 12 are positioned by the convex portion 16a formed on the inner peripheral surface of the connecting bridge portion 16. This construction eliminates unstable holding of motor pumps 12, as found with the conventional engagement claw. The motor pumps 12 are installed stably so that they cannot fall off or slip down. Thus, reliability of the mounting is significantly increased.

As described above, the tank body 11 has the pump mounting portion 13 of a ring-like or enclosed shape in which the motor pumps 12 are installed so that they do not fall off. Additionally, the concave groove portion 15 is formed as an elongated groove shape extending from the one or top side of the tank body 11 to the other or bottom side. In blow forming, the parting plane 19 of the split patterns 17 and 18 is positioned so as to pass along the lower surface of the connecting bridge portion 16 and through the groove inner peripheral surface of the concave groove portion 15. Therefore, the pump mounting portion 13 can be formed without undercuts; as a result, the pattern drawing operation is simplified and the production rate is significantly improved.

The invention is not limited to the embodiment described. The structure can be used when three or more motor pumps are installed.

Although the invention has been described in specific terms, it is to be understood that the described embodiment is only illustrative and various changes and modifications may be imparted thereto without departing from the scope of the invention as defined by the appended claims.

What is claimed is:

1. A structure for mounting motor pumps to a vehicle window washer tank, in which said window washer tank is blow formed using a split pattern and a tank body of said window washer tank comprises:

a pump mounting portion for mounting a plurality of motor pumps, said pump mounting portion being formed in an elongated groove shape extending from one side of said tank body to the other side, comprising a concave groove portion having a groove width for accommodating said motor pumps in parallel; and a connecting bridge portion which connects both edges of the opening of said concave groove portion in a bridge form and has a convex portion for preventing one motor pump from shifting to an adjacent motor pump side which is formed on the inner peripheral surface of said connecting bridge portion so that said pump mounting portion is a ring-like shape to surround the periphery of said motor pumps installed in parallel in an embraced manner, the parting plane of said split pattern being positioned so as to pass through said concave groove portion and along a surface of said connecting bridge portion.

2. The structure for mounting motor pumps to a vehicle window washer tank according to claim 1, wherein the parting plane of said split pattern is positioned so as to relatively shift from one side of said tank body to the other side with respect to said concave groove portion and said connecting bridge portion.

3. A vehicle window washer tank which is blow formed using a split pattern mold, said tank comprising:

a tank body;

a pump mounting portion formed with said tank body for mounting a plurality of motor pumps in parallel, said pump mounting portion being an elongated groove extending from an upper side of said tank body to a lower side; and a connecting bridge portion extending from a first side edge of said groove to a second side edge of said groove and being substantially transverse to said groove, said bridge portion having a convex portion formed on an inner peripheral surface for maintaining the motor pumps in position with respect to one another, wherein said groove and said bridge portion provide a ring-like enclosure for the pump members and a parting plane of said split pattern mold is positioned to pass transversely through said groove and substantially along a lower surface of said bridge portion.

4. The vehicle window washer tank according to claim 3, wherein said bridge portion has a slope from an outer edge away from the pump members to an inner edge engaged with the pump members, said slope positioning said outer edge toward said upper side and said inner edge being toward said lower side such that said convex portion contacts the pump motors at substantially a mid-point as defined by a longitudinal axis of the motor pumps.

5. A structure for mounting motor pumps to a window washer tank of a vehicle, comprising:

a groove formed from a top side of the washer tank to a bottom side of the washer tank; and a bridge extending from a first side edge of said groove to a second side edge of said groove, said bridge having an indentation on an inner surface configured to receive a motor pump and projecting portions on each side of said indentation for retention in position of the motor pump, said groove and the bridge in combination retaining the motor pump, wherein the washer tank is formed by a split pattern mold having a parting plane passing through said groove and along a surface of said bridge.

6. The structure according to claim 5, wherein said groove is wide enough to receive two motor pumps in parallel and said bridge has two indentations for retaining the motor pumps in position.

7. The structure according to claim 5, wherein said groove width is based upon the number of motor pumps to be mounted and said bridge has an indentation for retaining each of the motor pumps.

8. The structure according to claim 6, wherein said projecting portions contact the motor pump closer to a plane passing through the mid-point of the motor pump, and transverse to a longitudinal axis of the motor pump, than does said indentation.

* * * * *